Patented June 7, 1949

2,472,147

UNITED STATES PATENT OFFICE 2,472,147

DIBENZYLIDENE DERIVATIVE OF 2,2,6,6,-TETRAMETHYLOLCYCLOHEXANOL

Otis C. Dermer, Stillwater, Okla., assignor to Cities Service Oil Company, Bartlesville, Okla., a corporation of Delaware No Drawing. Application August 18, 1948, Serial No. 44,987

1 Claim. (Cl. 260—338)

This invention relates to novel organic compositions and more particularly to the dibenzylidene derivative of 2,2,6,6-tetramethylolcyclohexanol, a new composition of matter.

I have discovered that the dibenzylidene derivative of 2,2,6,6,-tetramethylolcyclohexanol may be prepared by reacting benzaldehyde with 2,2,6,6,-tetramethylolcyclohexanol in cold acid solution, giving an oil which gradually solidifies upon standing with acid. Upon repeated recrystallizations from 95 per cent ethanol and benzene, a solid crystalline material may be obtained which melts at 184-185° C. This product is a white crystalline solid at normal temperatures.

The benzylidene content of this material was obtained by the method of Angyal and Lawlor (J. A. C. S. 66, 837 (1944)) which indicated a benzylidene content of 44.5 and 44.9 per cent on two trials, the theoretical for

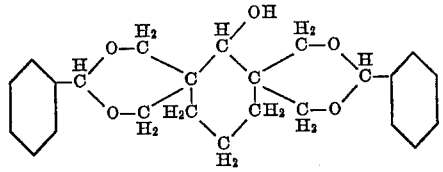

being 45.5 per cent.

Carbon and hydrogen analyses were run of the material, which gave carbon observed as 71.995 and 72.101, as compared with a theoretical carbon content of 72.7 per cent; and hydrogen content observed as 7.98 and 7.86 per cent, as compared with a theoretical hydrogen content of 7.12 per cent. Thus method of preparation and analysis both indicate that the material is the new dibenzylidene derivative of the tetramethylolcyclohexanol.

This new dibenzylidene derivative of 2,2,6,6,-tetramethylolcyclohexanol is useful as an intermediate in organic syntheses.

Having now described my invention, what I claim as new is:

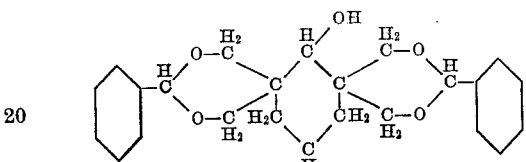

OTIS C. DERMER.

No references cited.